United States Patent
Lee et al.

(10) Patent No.: US 9,358,867 B2
(45) Date of Patent: *Jun. 7, 2016

(54) MICRO ELECTRO-MECHANICAL SYSTEM (MEMS) BASED HYDRAULIC CONTROL SYSTEM FOR FULL HYBRID VEHICLES

(75) Inventors: Chunhao J. Lee, Troy, MI (US); Farzad Samie, Franklin, MI (US); Chi-Kuan Kao, Troy, MI (US); Kumaraswamy V. Hebbale, Troy, MI (US); Dongxu Li, Warren, MI (US); Andrew L. Bartos, Clarkston, MI (US); Kevin B. Rober, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1385 days.

This patent is subject to a terminal disclaimer.

(21) Appl. No.: 13/166,848

(22) Filed: Jun. 23, 2011

(65) Prior Publication Data

US 2012/0090426 A1 Apr. 19, 2012

Related U.S. Application Data

(60) Provisional application No. 61/393,388, filed on Oct. 15, 2010.

(51) Int. Cl.
*B60K 6/36* (2007.10)
*B60W 10/02* (2006.01)
*F16K 99/00* (2006.01)
*F16H 61/02* (2006.01)
*B60W 20/00* (2006.01)

(52) U.S. Cl.
CPC .................. *B60K 6/36* (2013.01); *B60W 10/02* (2013.01); *F16K 99/0007* (2013.01); *F16K 99/0036* (2013.01); *F16K 99/0044* (2013.01); *B60W 20/00* (2013.01); *B60Y 2400/4244* (2013.01); *F16H 61/0251* (2013.01); *Y10T 74/19051* (2015.01)

(58) Field of Classification Search
None
See application file for complete search history.

(56) References Cited

U.S. PATENT DOCUMENTS

| | | | |
|---|---|---|---|
| 6,494,804 B1 | 12/2002 | Hunnicutt | |
| 6,540,203 B1 | 4/2003 | Hunnicutt | |
| 6,755,761 B2 | 6/2004 | Hunnicutt | |
| 8,695,774 B2* | 4/2014 | Lee et al. | 192/85.63 |
| 8,794,417 B2* | 8/2014 | Lee et al. | 192/85.63 |
| 8,800,404 B2* | 8/2014 | Lee et al. | 74/661 |
| 8,844,694 B2* | 9/2014 | Hebbale et al. | 192/48.601 |
| 8,844,702 B2* | 9/2014 | Lee et al. | 192/85.63 |
| 8,845,491 B2* | 9/2014 | Li et al. | 477/156 |
| 8,887,891 B2* | 11/2014 | Lee et al. | 192/85.63 |
| 8,925,699 B2* | 1/2015 | Li et al. | 192/3.29 |
| 8,935,971 B2* | 1/2015 | Samie et al. | 74/730.1 |
| 2002/0174891 A1* | 11/2002 | Maluf et al. | 137/14 |
| 2003/0109357 A1 | 6/2003 | Tabata | |
| 2004/0007405 A1 | 1/2004 | Noda et al. | |
| 2004/0220015 A1 | 11/2004 | Murakami et al. | |
| 2008/0103003 A1* | 5/2008 | Sah et al. | 475/5 |

* cited by examiner

*Primary Examiner* — Mark Manley
(74) *Attorney, Agent, or Firm* — Quinn Law Group, PLLC

(57) ABSTRACT

A powertrain system in a hybrid vehicle includes a hydraulic device, a pilot valve, and a regulator valve. The pilot valve is operably connected to the hydraulic device and configured to actuate. The pilot valve includes at least one micro-electromechanical systems (MEMS) based device. The regulator valve is operably connected to the pilot valve and the hydraulic device. The regulator valve is configured to direct fluid to the hydraulic device based on the actuation of the pilot valve.

9 Claims, 4 Drawing Sheets

MICRO ELECTRO-MECHANICAL SYSTEM (MEMS) BASED HYDRAULIC CONTROL SYSTEM FOR FULL HYBRID VEHICLES

CROSS-REFERENCE TO RELATED APPLICATIONS

This application claims the benefit of U.S. Provisional Patent Application No. 61/393,388, filed Oct. 15, 2010, which is hereby incorporated by reference in its entirety.

TECHNICAL FIELD

The disclosure relates to a Micro Electro-Mechanical System (MEMS) based hydraulic control system.

BACKGROUND

Passenger and commercial vehicles include various hydraulic devices. Valves allow fluid to flow from a pump to the hydraulic device. However, the valves may be large and expensive, adding weight and cost to the vehicle.

SUMMARY

A powertrain system in a hybrid vehicle includes a transmission configured to selectively receive a torque from an engine and at least one motor. The transmission includes a hydraulic device and a pilot valve. The pilot valve is operably connected to the hydraulic device and configured to actuate. The pilot valve includes at least one Micro Electro-Mechanical System (MEMS) based device. A regulator valve is operably connected to the pilot valve and the hydraulic device. The regulator valve is configured to direct fluid to the hydraulic device based on the actuation of the pilot valve.

A vehicle includes an engine and at least one motor configured to generate a torque. A transmission is configured to receive the torque generated by at least one of the engine and the at least one motor. A clutch assembly is configured to transfer a torque from the engine to the transmission. The transmission includes a hydraulic device operably connected to a pilot valve and a regulator valve. The pilot valve includes at least one MEMS based device.

The powertrain system disclosed herein provides a reduced weight and cost solution to hydraulic control in a hybrid vehicle.

The above features and advantages and other features and advantages of the present invention are readily apparent from the following detailed description of the best modes for carrying out the invention when taken in connection with the accompanying drawings.

DETAILED DESCRIPTION

A powertrain system as described herein provides reduced weight and cost solution to hydraulic control in a hybrid vehicle. In one particular implementation, the powertrain system may include a hydraulic device and a pilot valve. The pilot valve is operably connected to the hydraulic device and configured to actuate. The pilot valve includes at least one Micro Electro-Mechanical System (MEMS) based device. A regulator valve is operably connected to the pilot valve and the hydraulic device. The regulator valve is configured to direct fluid to the hydraulic device based on the actuation of the pilot valve. The use of a MEMS-based device in the pilot valve reduces the weight and cost of the powertrain system.

Figure 1:
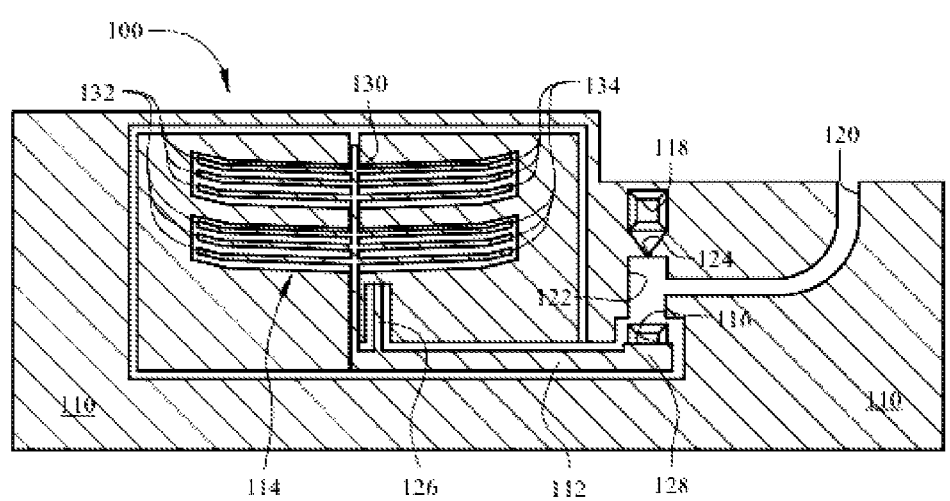
FIG. 1 is a schematic cross-sectional view of a Micro Electro-Mechanical System (MEMS) microvalve actuator.

FIG. 1 illustrates a Micro Electro-Mechanical System (MEMS) microvalve 100 that provides a reduced weight and cost solution to hydraulic control in a vehicle. The MEMS microvalve 100 may take many different forms and include multiple and/or alternate components and facilities. While an example MEMS microvalve 100 is shown in the figures, the components illustrated in the figures are not intended to be limiting. Indeed, additional or alternative components and/or implementations may be used.

As discussed below, the MEMS microvalve 100 may be used to effect hydraulic control over one or more hydraulic components, especially within a transmission. The MEMS microvalve 100 shown is only one type of MEMS device that may be used as a control valve or control actuator for the hydraulic components, and others, discussed herein.

While various MEMS devices are described in detail with respect to automotive applications, MEMS devices may be used in other areas as well. Further, terms such as "above," "below," "upward," "downward," etc. are used descriptively of the figures, and do not represent limitations on the scope of the invention, as defined by the appended claims.

Generally, MEMS devices may be considered as part of a class of systems that are physically small, having features with sizes in the micrometer range. MEMS systems may have both electrical and mechanical components. MEMS devices are produced through micromachining processes. The term "micromachining" may generally refer to the production of three-dimensional structures and moving parts through processes including modified integrated circuit (computer chip) fabrication techniques (such as chemical etching) and materials (such as silicon semiconductor material). The term "microvalve" as used herein may generally refer to a valve having components with sizes in the micrometer range, and thus by definition is at least partially formed by micromachining. As such, the term "microvalve device" may include a device having one or more components with sizes in the micrometer range. MEMS devices may operate in conjunction with other MEMS (micromachined) devices or components or may be used with standard sized (larger) components, such as those produced by mechanical machining processes (e.g., a metal spool valve).

Referring to FIG. 1, the MEMS microvalve 100 includes a housing or body 110. The MEMS microvalve 100 may be formed from several material layers, such as semi-conductor wafers. The body 110 may also be formed from multiple layers. For example, and without limitation, the cross-sectioned portions shown may be taken through a middle layer of the MEMS microvalve 100, with two other layers existing behind and in front of (relative to the view in FIG. 1) the middle layer. The other layers of the body 110 may include solid covers, port plates, or electrical control plates. However each of the layers is generally considered part of the body 110, except where separately identified.

The MEMS microvalve 100 includes a beam 112 actuated by a valve actuator 114. Selective control of the actuator 114 causes the beam 112 to selectively alter the flow of fluid between an inlet port 116 and an outlet port 118. By varying the fluid flow between the inlet port 116 and the outlet port 118, the MEMS microvalve 100 varies the pressure in a pilot port 120. As described herein, the pilot port 120 may be connected to additional valves or devices in order to effect hydraulic control thereof through a pilot signal which varies based upon the pressure in the pilot port 120.

The inlet port 116 is connected to a source of high-pressure fluid such as a pump (not shown). The outlet port 118 is connected to a low-pressure reservoir or fluid return (not shown). For purposes of the description herein, the outlet port 118 may be considered to be at ambient pressure, and acts as a ground or zero state in the MEMS microvalve 100.

The beam 112 moves in a continuously variable manner between a first position, illustrated in FIG. 1, a second position (not shown), and myriad intermediate positions. In the first position, the beam 112 does not completely block the inlet port 116. However, in the second position, the beam 112 blocks the inlet port 116 to prevent substantially all flow from the high-pressure fluid source.

A first chamber 122 is in fluid communication with both the inlet port 116 and the outlet port 118. However, communication between the outlet port 118 and the first chamber 122 (and also the inlet port 116) is restricted by an outlet orifice 124. High volume or fast fluid flow through the outlet orifice 124 causes a pressure differential to build between the first chamber 122 and the outlet port 118.

The beam 112 is pivotally mounted to a fixed portion of the body 110 by a flexure pivot 126. The opposite portion of the beam 112 from the flexure pivot 126 is a movable end 128, which moves up and down (as viewed in FIG. 1) to selectively, and variably, cover and uncover the inlet port 116.

When the beam 112 is in the second position, it allows little or no flow from the inlet port 116 to the first chamber 122. Any pressurized fluid in the first chamber 122 bleeds off through the outlet orifice 124 to the outlet port 118. As the beam 112 of the MEMS microvalve 100 is moved toward the first (open) position, the inlet port 116 is progressively uncovered, allowing faster flows of fluid from the inlet port 116 into the first chamber 122. The fast-flowing fluid cannot all be drained through the outlet orifice 124 and causes a pressure differential to form as the fluid flows through the outlet orifice 124, raising pressure in the first chamber 122.

As the inlet port 116 is further opened to the first position (as shown in FIG. 1), fluid gradually flows faster through the outlet orifice 124, causing a larger pressure differential and further raising the pressure in the first chamber 122. When the beam 112 is in the first position, it allows high flow from the inlet port 116 to the first chamber 122. Therefore, the pressure in the first chamber 122 can be controlled by controlling the rate of flow from the inlet port 116 through the first chamber 122 and the outlet orifice 124 to the outlet port 118. The position of the beam 112 controls the rate of flow of the fluid from the inlet port 116, and thus the pressure in the first chamber 122.

The valve actuator 114 selectively positions the beam 112. The actuator 114 includes an elongated spine 130 attached to the beam 112. The actuator 114 further includes a plurality of first ribs 132 and a plurality of second ribs 134, which are generally located on opposing sides of the elongated spine 130. Each of the first ribs 134 has a first end attached to a first side of the elongated spine 130 and a second end attached to the body 110. Similar to the first ribs 132, each of the second ribs 134 has a first end attached to the elongated spine 130 and a second end attached to the fixed portion of the body 110.

The elongated spine 130 and the first ribs 132 and the second ribs 134 may appear illustrated in FIG. 1 as disconnected from the body 110. However, the elongated spine 130, the first ribs 132, and the second ribs 134 are formed from the same material and are connected to the body 110 at some point in order to allow relative movement. However, the connection may be below the cross-sectioned plane shown in FIG. 1. Generally, the elongated spine 130, the first ribs 132, and the second ribs 134 may be considered the moving portions of the actuator 114.

The first ribs 132 and the second ribs 134 are configured to thermally expand (elongate) and contract (shrink) in response to temperature changes within the first ribs 132 and the second ribs 134. Electrical contacts (not shown) are adapted for connection to a source of electrical power to supply electrical current flowing through the first ribs 132 and the second ribs 134 to thermally expand the first ribs 132 and the second ribs 134.

The actuator 114 is configured to be controlled by an engine control unit (ECU) or other programmable device (not shown in FIG. 1) which supplies variable current to the first ribs 132 and the second ribs 134. As the first ribs 132 and the second ribs 134 expand due to sufficient current flow, the elongated spine 130 moves or stretches downward (as viewed in FIG. 1), causing the beam 112 to rotate in the generally counter-clockwise direction. The resulting movement of the beam 112 causes the moveable end 128 to move upward (as viewed in FIG. 1) and progressively block more of the inlet port 116.

Closing the inlet port 116 allows less (and eventually no) fluid to flow into the first chamber 122, decreasing the pressure therein as the fluid drains to the outlet port 118. Once the inlet port 116 is closed, the MEMS microvalve 100 is in the second position (not shown), and no pilot signal is being communicated through the pilot port 120.

As the flow of current drops, the first ribs 132 and the second ribs 134 contract and the elongated spine 130 moves upward (as viewed on the page in FIG. 1), causing the beam 112 to rotate in the generally clockwise direction. The resulting movement of the beam 112 causes the moveable end 128 to move downward (as viewed on the page in FIG. 1) and progressively open more of the inlet port 116.

Opening the inlet port 116 allows more fluid to flow into the first chamber 122, increasing the pressure therein as the fluid flow overcomes the ability of the outlet port 118 to drain fluid from the first chamber 122. Once the inlet port 116 is substantially open, the MEMS microvalve 100 is in the first position (shown in FIG. 1), and a strong pilot signal is being communicated through the pilot port 120.

In addition to the heat-actuated MEMS device shown in FIG. 1, other types of MEMS based actuators may be used in place of the MEMS microvalve 100 or in place of the actuator 114. In general, the micro-electro-mechanical system (MEMS) based device may include any device that has one or more electronic elements fabricated through an integrated circuit technique (e.g., etching on a silicon wafer) and one or more mechanical elements fabricated through a micromachining process (e.g., forming structures and moving parts with dimensions in the micrometer range). The electronic and mechanical elements may also be formed by other processes. In alternative or additional approaches or configurations, the MEMS-based device may include other elements with dimensions in the micrometer range, such as an electromagnetic field actuator, a piezoelectric actuator, a thermal actuator, an electrostatic actuator, a magnetic actuator, a shape memory alloy, a pressure sensor, a gyroscope, an optical switch, other MEMS-based devices, or any combination thereof.

Figure 2:
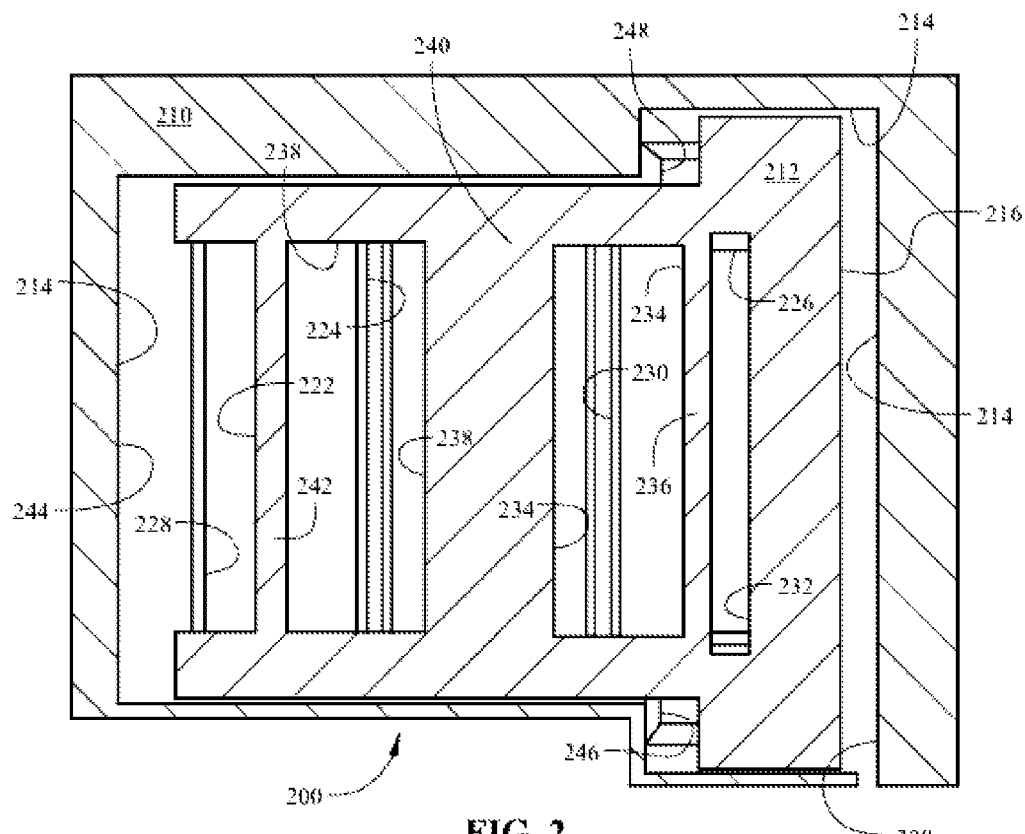
FIG. 2 is a schematic cross-sectional view of a MEMS spool valve that may be used alone or in conjunction with the MEMS microvalve actuator shown in FIG. 1.

Referring now to FIG. 2, and with continued reference to FIG. 1, there is shown a schematic cross-sectional view of a MEMS-based spool valve 200. The MEMS-based spool valve 200 includes a housing or body 210. The MEMS-based spool valve 200 may be formed from several material layers, such as semi-conductor wafers. The body 210 may also be formed from multiple layers. For example, and without limitation, the cross-sectioned portions shown may be taken through a middle layer of the MEMS-based spool valve 200, with two other layers existing behind and in front of (relative to the view in FIG. 2) the middle layer.

The MEMS-based spool valve 200 includes a slider 212 configured to be movable to the left and to the right (as viewed on the page in FIG. 2) within a cavity 214 defined by the body 210. The slider 212 is actuated by fluid pressure on a piloted surface 216, which is in fluid communication with a piloted chamber 220 of the cavity 214. Selective variation of pressure within the piloted chamber 220 alters the force applied to the piloted surface 216. The piloted chamber 220 may be in fluid communication with a pilot signal, such as the pilot signal produced by the pilot port 120 of the MEMS microvalve 100 shown in FIG. 1.

The slider 212 is formed with an elongated plate having a pair of oppositely disposed arms extending perpendicularly at a first end of the body so that the slider 212 is generally a T-shape, having the piloted surface 216 at a wider longitudinal end of the slider 212, and a counter surface 222 at a relatively narrower opposing longitudinal end of the slider 212. The cavity 214 is also generally a T-shape.

The body 210 defines a number of ports connecting with the cavity 214, some of which may be formed in cross-sectioned layer and some of which may be formed in other layers. The ports include a supply port 224, which is adapted to be connected to a source of high pressure fluid, such as a transmission pump (not shown). The supply port 224 may be connected to the same source of high-pressure fluid as the inlet port 116 of the MEMS microvalve 100 shown in FIG. 1. The body 210 also defines a tank port 226, which is connected to a low-pressure reservoir or fluid return (not shown). The tank port 226 may be connected to the same source of low-pressure fluid as the outlet port 118 of the MEMS microvalve 100 shown in FIG. 1.

A first load port 228 and a second load port 230 are formed in the body and communicate with the cavity 214. The first load port 228 and the second load port 230 are disposed on opposite sides of the supply port 224. The first load port 228 and the second load port 230 are adapted to be connected together to supply pressurized fluid to a hydraulically-operated component of the transmission or powertrain, as described herein. Additional ports, channels, or troughs (not viewable in FIG. 2) may be formed on the upper surface of the cavity 214 opposite the first load port 228 and the tank port 226. The additional troughs help balance flow forces acting on the slider 212.

The slider 212 shown includes three openings therethrough. A first opening 232, close to the piloted surface 216, is defined through the slider 212 to permit the fluid volume to equalize through the trough above the tank port 226 with the pressure at the tank port 226, balancing forces acting vertically (into and out of the view shown in FIG. 2) on the slider 212. A second opening 234 through the slider 212 forms an internal volume that is always in communication with the second load port 230.

A web 236 between the second opening 234 and the first opening 232 permits or prevents flow between the second load port 230 and the tank port 226 depending upon the position of the slider 212. In the illustrated position, the web 236 prevents flow between the second load port 230 and the tank port 226. When the web 236 moves to the right (as viewed on the page in FIG. 2), a fluid pathway between the second load port 230 and the tank port 226 is opened, venting any pressure present at the second load port 230 to the low pressure reservoir connected to the tank port 226.

A third opening 238 through the slider 212 permits the fluid volume in the trough above the first load port 228 to equalize with the pressure at the first load port 228, balancing forces acting vertically (into and out of the view shown in FIG. 2) on the slider 212. A web 240 between the second opening 234 and the third opening 238 prevents flow between the supply port 224 and the second load port 230 in all positions of the slider 212.

A web 242 between the third opening 238 and the counter surface 222 permits or prevents flow between the supply port 224 and the first load port 228, depending upon the position of the slider 212. In the illustrated position, the web 242 prevents flow between the supply port 224 and the first load port 228. When the slider 212 moves to the left (as viewed on the page in FIG. 2), a fluid pathway opens between the supply port 224 and the first load port 228, supplying pressurized fluid to the load connected to the first load port 228.

The slider 212 cooperates with the walls of the cavity 214 to define the piloted chamber 220 between the piloted surface 216 and the opposing wall of the cavity 214. A counter chamber 244 is defined between the counter surface 222 and the opposing wall of the cavity 214. The counter chamber 244 is in fluid communication with the first load port 228 at all times. Additionally, two volumes 246 and 248 may be defined between respective pairs of shoulders of the T-shaped plate forming the slider 212 and the shoulders of the T-shaped cavity 214. The volumes 246 and 248 are in communication with the tank port 226 at all times. In this manner, a hydraulic lock of the slider 212 is prevented.

The total area of the piloted surface 216 of the slider 212 is larger than the total area of the counter surface 222 of the slider 212. Therefore, when the pressures in the piloted chamber 220 and the counter chamber 244 are equal, the resultant unbalanced net force acting on the slider 212 will urge the slider 212 to the left (as viewed on the page in FIG. 2).

Figure 3:
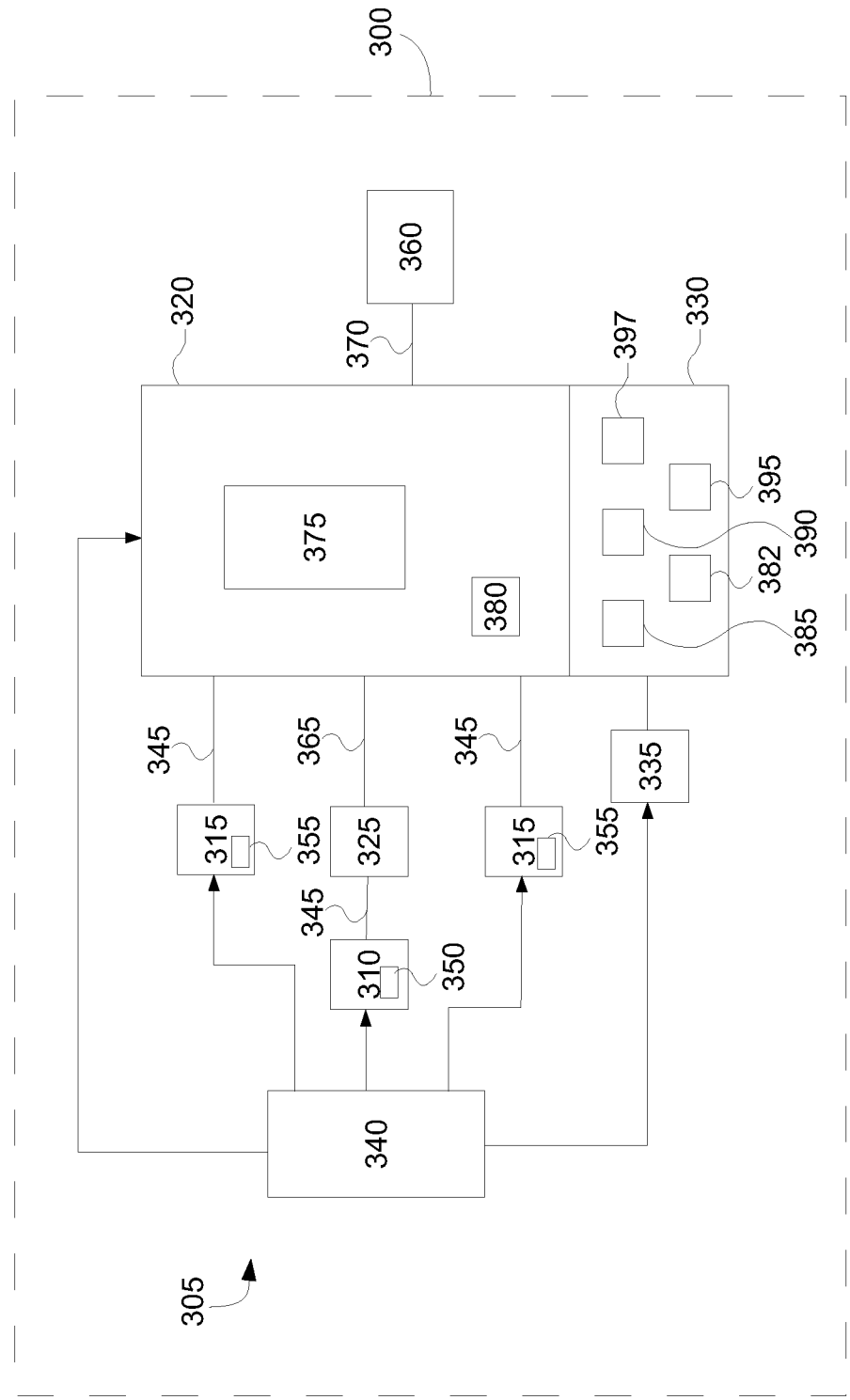
FIG. 3 is a schematic diagram of powertrain system that may implement the MEMS devices of FIGS. 1 and 2 in a hybrid vehicle.

Referring now to FIG. 3, the MEMS microvalve 100 and the MEMS-based spool valve 200 may be implemented in a hybrid vehicle 300. In particular, the MEMS devices of FIGS. 1 and 2 may be implemented in a powertrain system 305 that may include an engine 310, two motors 315, a transmission 320, a clutch assembly 325, a valve body 330, a pump 335, and a control processor 340. The vehicle 300 may be a passenger or commercial automobile. As such, the MEMS microvalve 100 and the MEMS-based spool valve 200 may be implemented in a hybrid electric vehicle, such as a plug-in hybrid electric vehicle (PHEV) or an extended range hybrid vehicle (EREV), or the like. Of course, the MEMS microvalve 100 and the MEMS-based spool valve 200 may have other implementations besides use in the vehicle 300.

The engine 310 may include any device configured to provide a torque to the transmission 320. For instance, the engine 310 may include an internal combustion engine 310 configured to generate rotational motion by combusting a fossil fuel and air mixture. The rotational motion generated by the engine 310 may be output via a crankshaft 345. Further, the operation of the engine 310 may be controlled by an engine control unit 350.

The motors 315 may each include any device configured to convert electrical energy into motion. For instance, the motors 315 may receive electrical energy from a power source (not shown), such as a battery. Additionally, one or both of the motors 315 may further act as a generator. That is, the motors 315 may be configured to convert rotational motion into electrical energy that may be stored by the power source. The motors 315 may be configured to provide a torque to the transmission 320. Like the engine 310, the motors 315 may output torque to the transmission 320 via a crankshaft 345. The operation of the motors 315 may be controlled via one or more motor control units 355. Although two motors 315 are illustrated in FIG. 3, the vehicle 300 may include any number of motors 315.

The transmission 320 may include any device configured to output a torque to wheels 360 of the vehicle 300. The transmission 320 may include an input shaft 365, an output shaft 370, and a gearbox 375. The input shaft 365 may be used to receive the torque generated by the engine 310 and/or motors 315 either directly or through the clutch assembly 325 (discussed in greater detail below). Although not illustrated, additional clutch assemblies (not shown) may be disposed between the transmission and the motors 315. The output shaft 370 may be used to output a torque to wheels 360 of the vehicle 300. The gearbox 375 may include gears of various sizes and configurations (e.g., planetary) that may be used to change the rotational speed of the output shaft 370 relative to the input shaft 365 and torque from the motors 315. The gears in the gearbox 375 may be engaged and disengaged through the use of various clutches (not shown) within the gearbox 375. Indeed, one or more of the clutches in the gearbox 375 may be used instead of or in addition to the clutch assembly 325. The operation of the transmission 320 may be controlled via a transmission control unit 380. In one possible approach, the transmission 320 may be configured to receive torque from the engine 310, one or more of the motors 315, or all three simultaneously.

The clutch assembly 325 may be any hydraulically actuated device that is configured to transfer the torque generated by the engine 310 or the motors 315 to the transmission 320. For example, the clutch assembly 325 may be operably connected to the crankshaft 345 of the engine 310 and/or the motors 315 and the input shaft 365 of the transmission 320. The clutch assembly 325 may include a driving mechanism (not shown) and a driven mechanism (not shown). The driving mechanism may be operably disposed on the crankshaft 345. Accordingly, the driving mechanism may rotate at the same speed as the crankshaft 345 of the engine 310 and/or the motor 315. The driven mechanism may be operably disposed on the input shaft 365, which may cause the driven mechanism and the input shaft 365 to rotate at the same speeds. In one possible implementation, the clutch assembly 325 may be disposed within the gearbox 375 of the transmission 320 or replaced by clutches disposed within the gearbox 375.

The driving mechanism and the driven mechanism may be configured to engage one another. The engagement of the driving mechanism and the driven mechanism may be controlled by the control processor 340, the engine control unit 350, the motor control unit 355, the transmission control unit 380, and/or any other device configured to generate a control signal. For instance, the transmission control unit 380 may generate one or more control signals to control the engagement of the driving mechanism and driven mechanism based on factors such as a speed of the vehicle 300, a gear selection by the driver of the vehicle 300, etc. Further, the engagement of the driving mechanism and the driven mechanism may be carried out hydraulically. That is, fluid pressure may cause the driving mechanism to engage the driven mechanism. When engaged, the driving mechanism and driven mechanism may rotate at substantially the same speeds. As such, the torque generated by the engine 310 is transferred to the transmission 320. Additionally, the driving mechanism and the driven mechanism may be configured to partially engage, resulting in a slip across the driving and driven mechanisms. This way, the driving mechanism may impart some of the engine torque to the driven mechanism.

The valve body 330 may be part of the transmission 320 and may include a plurality of valves (e.g., hydraulic devices), such as one or more clutch control valves 382, a lube regulating valve 385, a line pressure control valve 390, one or more synchronizer valves 395, and one or more selectable one-way clutch control valves 397. Each of these and/or other valves may be controlled by one or more MEMS devices, such as the MEMS microvalve 100 and/or the MEMS based spool valve 200 described above. In one example approach, the MEMS microvalve 100 and/or the MEMS based spool valve 200 may provide on/off control of one or more valves in the valve body 330 or located elsewhere in the vehicle 300. As such, the MEMS microvalve 100 and/or the MEMS based spool valve 200 may replace one or more on/off solenoids. The valve body 330 may further define a fluid circuit that allows fluid to flow from the pump 335 to the various portions of the transmission 320. The plurality of valves within the valve body 330 may be used to control the flow of fluid from the pump 335 and through the fluid circuit to the various components of the transmission 320. One or more of the valves within the valve body 330 may be electrically actuated (e.g., solenoid valves) or hydraulically actuated. In one example implementation, the valve body 330 may be part of the transmission 320 or a separate device. As such, one or more of the MEMS microvalve 100 and the MEMS based spool valve 200 may be disposed within the valve body 330 or the transmission 320.

The clutch control valve 382 may include any device configured to control the flow of fluid to, for instance, the clutch assembly 325. The lube regulating valve 385 may include any device configured to control the flow of fluid to, for instance, a lubrication circuit. The line pressure control valve 390 may include any device configured to control the fluid pressure provided to the valve body 330 and/or any other hydraulic device within the powertrain system 305. The synchronizer valve 395 may include any device configured to control fluid flow to a synchronizer. In one possible implementation, the synchronizer may include a device that synchronizes a speed of rotation of two spinning objects prior to engaging the objects. As such, the synchronizer may be used to synchronize the rotational speeds of a clutch prior to engagement of the clutch. The selectable one-way clutch control valve 397 may include any device configured to control fluid flow to a one-way clutch (e.g., a clutch that only transfers torque in a single rotational direction). Of course, the valve body 330 may include other valves than those described.

The pump 335 may include any device configured to provide pressurized fluid to various components of the transmission 320, engine 310, and/or clutch assembly 325 via, for instance, the valve body 330. In one particular approach, the pump 335 may receive a commanded pressure from, for example, the control processor 340, the engine control unit 350, the transmission control unit 380, or a combination of these or any other computing devices, and provide fluid at the commanded pressure. The powertrain system 305 may include any number of pumps 335 to provide fluid to the various hydraulic devices in the powertrain system 305.

The control processor 340 may include any device configured to generate signals that control the operation of one or more of the components in the powertrain system 305. For instance, the control processor 340 may be configured to control the operation of the pump 335 by generating a signal that represents the commanded pressure. Moreover, as described in greater detail below, the control processor 340 may be configured to control the operation of the MEMS devices. For instance, the control processor 340 may be configured to generate signals that cause one or more MEMS microvalves 100 within the powertrain system 305 to actuate. Additionally, the control processor 340 may be configured to generate signals to actuate the various valves, such as solenoid valves, within the transmission 320. In one example implementation, one or more of the engine control unit 350, the motor control unit 355, and the transmission control unit 380 may be configured to perform one or more of the functions of the control processor 340. In this way, the engine control unit 350, the motor control unit 355, and/or the transmission control unit 380 may control fluid flow from the pump 335 to various devices within the powertrain system 305. Further, the engine control unit 350, the motor control unit 355, and/or the transmission control unit 380 may be part of the control processor 340.

In general, computing systems and/or devices, such as the control processor 340, the engine control unit 350, the motor control unit 355, and the transmission control unit 380, may employ any of a number of computer operating systems and generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a compute). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission 320 media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

FIGS. 4-7 illustrate multiple schematic box diagrams of pressure control systems for hydraulic components within a transmission 320, such as the powertrain shown in FIG. 3. Each of the plurality of options for the pressure control system shown and described may be used for operation and control of any of the plurality of components shown and described, including the clutch control valve 382, the lube regulating valve 385, the line pressure control valve 390, the synchronizer valve 395, and the selectable one-way clutch control valve 397. Furthermore, additional pressure control system options may be created by combining the various MEMS devices discussed with other MEMS devices and metal valves.

Figure 4:
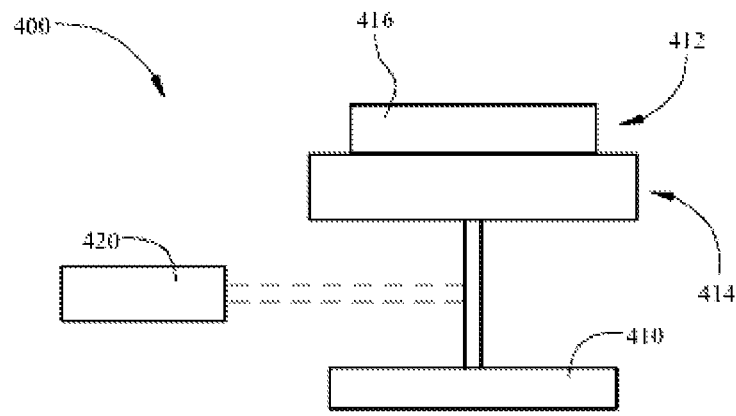
FIG. 4 is a schematic box diagram of a first option for a pressure control system for a hydraulic-controlled component within a powertrain for a hybrid vehicle.

FIG. 4 shows a first option 400 for a pressure control system for a hydraulically-actuated component 410 within the powertrain. The hydraulically-controlled component 410 may be any one of the components of the powertrain shown in FIG. 3. For example, and without limitation, the hydraulically-controlled component 410 may be one or more of: the clutch control valves 382, the lube regulating valve 385, the line pressure control valve 390, the synchronizer valves 395, and the selectable one-way clutch control valves 397. In some implementations of the powertrain, the hydraulically-controlled component 410 may actually be two or more of these components.

The first option 400 includes a pilot valve 412 controlling a regulating valve 414. The regulating valve 414 is in fluid communication with the pilot valve 412. The pilot valve 412 includes a first valve 416 producing a pilot signal. The regulating valve 414 is configured to receive the pilot signal and the regulating valve 414 is configured to output a control signal that controls the hydraulically-actuated component 410.

In the first option 400 shown in FIG. 4, the first valve 416 may include a MEMS device such as the MEMS microvalve 100 shown in FIG. 1. The regulating valve 414 may further include a MEMS device such as the MEMS-based spool valve 200. Therefore, as described herein, the MEMS microvalve 100 may produce the pilot signal and communicates through the pilot port 120 to the piloted chamber 220 of the MEMS-based spool valve 200.

Referring back to the example approaches illustrated in FIGS. 1 and 2, when the MEMS microvalve 100 shown in FIG. 1 is combined with the MEMS-based spool valve 200, either by attaching the two directly together or by fluidly connecting the pilot port 120 and piloted chamber 220, the MEMS microvalve 100 acts on the MEMS-based spool valve 200 to alter the fluid flow and pressure to the first load port 228 and the second load port 230.

The inlet port 116 in the MEMS microvalve 100 is relatively small in comparison to the supply port 224 and the first load port 228 of the MEMS-based spool valve 200. In combined operation, the beam 112 of the MEMS microvalve 100 uncovers the inlet port 116, and fluid flows through the inlet port 116, the first chamber 122, and the outlet orifice 124 to the outlet port 118. The inlet port 116 may act as an additional orifice in this flow path.

Due to possible pressure drop through the inlet port 116, it may not be possible to get the pressure in the piloted chamber 220 of the MEMS-based spool valve 200 up to the pressure provided by the high-pressure fluid source. The pressure in the counter chamber 244 may achieve a higher pressure (at or near pump 335 outlet pressure) than may be achieved in the piloted chamber 220, owing to the larger openings of the supply port 224 and the first load port 228 of the MEMS-based spool valve 200, and resultant low pressure drop when fluid flows through these ports. However, because the surface area of the piloted surface 216 is greater than the surface area of the counter surface 222, the slider 212 can still be moved leftward (as viewed on the page in FIG. 2) even if the pressure in the piloted chamber 220 acting on the piloted surface 216 is less than the pressure in the counter chamber 244.

The MEMS-based spool valve 200 has three principal zones or positions of operation: a pressure increase position, a pressure hold position, and a pressure decrease position. The MEMS-based spool valve 200 is shown in FIG. 2 in the pressure hold position, such that the MEMS-based spool valve 200 is holding pressurized fluid on the hydraulically-actuated component 410 (the load).

If the slider 212 is moved rightward (as viewed on the page in FIG. 2), the MEMS-based spool valve 200 is in the pressure decrease position. This may be accomplished when the control processor 340 or another computing device commands the MEMS microvalve 100 to close by increasing electric current supplied to the actuator 114. The first and second ribs 132 and 134 of the actuator 114 expand, causing the beam 112 to pivot counter-clockwise (bending the flexure pivot 126) and cover more of the inlet port 116. Flow decreases through the first chamber 122 from the inlet port 116 to the outlet port 118. The pressure drop across the outlet orifice 124 decreases.

Pressure in the first chamber 122 and the pilot port 120 also decreases. Because the pilot port 120 is in direct fluid communication with the piloted chamber 220, this results in an imbalance of the forces acting on the slider 212. The decreased force acting on the piloted surface 216 (due to the lowered pressure in the piloted chamber 220) is now less than the unchanged force acting on the counter surface 222 due to the pressure in the counter chamber 244 (connected to the load).

The force imbalance urges the slider 212 of the MEMS-based spool valve 200 to the right (as viewed in FIG. 2). The web 236 is thus moved rightward, permitting flow of pressurized fluid from the hydraulically-controlled component 410, through the second load port 230 and through the second opening 234 in the slider 212. From there, some of the flow passes directly out of the tank port 226, while some flow may pass up into the trough above the tank port 226, over the top of the web 236, down through the first opening 232 and out the tank port 226. In this manner, pressure is released from the hydraulically-controlled component 410 and vented to the low pressure reservoir connected to the tank port 226.

The slider 212 of the MEMS-based spool valve 200 will move back to the pressure hold position when the pressure in the counter chamber 244 (acting through the first load port 228) is decreased sufficiently that forces acting on the slider 212 urge the slider 212 to move to the left (as viewed in FIG. 2). With forces equalized, the slider 212 of the MEMS-based spool valve 200 will stop in the pressure hold position. Thus, the pressure at the load (as sensed through the first load port 228 and the second load port 230) will be proportionate to the electrical signal (current) supplied to the actuator 114.

To move the MEMS-based spool valve 200 into the pressure increase position, the control processor 340 or another computing device may decrease current flow through the ribs of the actuator 114 and the beam 112 of the MEMS microvalve 100 pivots clockwise to uncover more of the inlet port 116. This results in a pressure increase in the piloted chamber 220, while the pressure in the counter chamber 244 remains constant. The slider 212 is moved leftward (as viewed in FIG. 2) due to the resultant imbalance of forces acting on the slider 212. If the MEMS-based spool valve 200 was in the pressure decrease position, the leftward movement moves the slider valve back to the pressure hold position shown in FIG. 2.

If the control processor 340 further decreases current flow and causes the MEMS microvalve 100 to open further, the pressure in the piloted chamber 220 further increases, urging the slider 212 of the MEMS-based spool valve 200 further leftward (as viewed in FIG. 2) into the pressure increase position. The web 242 is moved leftward, permitting flow of pressurized fluid from the supply port 224 through the third opening 238 in the slider 212. From the third opening 238, some of the flow passes directly out of the first load port 228, while some flow may pass up into the trough over the top of the web 242, through the second counter chamber 244 and out of the first load port 228. In this manner, pressure is directed from the source of high-pressure fluid connected to the supply port 224 and applied to the load connected to the first load port 228 (e.g., the hydraulically-operated component 410).

The control signal produced by the MEMS-base spool valve 200 may have sufficient pressure and flow characteristics to control the hydraulically-controlled component 410. The pilot signal produced by the MEMS microvalve 100 may not be able to directly control the hydraulically-controlled component 410.

Referring back to FIG. 4, the first option 400 may further include a MEMS pressure sensor 420 that may be configured to sense the pressure profile of the control signal from the regulating valve 414. The control processor 340 or another computing device may be configured to receive input from the MEMS pressure sensor 420 and to provide output to the MEMS microvalve 100 in the pilot valve 412 to regulate the system pressure in response to input from the MEMS pressure sensor 420. Therefore, with the MEMS pressure sensor 420 and the control processor 340 or another computing device, the first option 400 may be configured for closed-loop feedback and adjustment of the control signal sent to the hydraulically-controlled component 410.

The hydraulically-controlled component 410 may be any one of the components of the powertrain shown in FIG. 3. For example, and without limitation, the hydraulically-controlled component 410 may be one or more of: the clutch control valves 382, the lube regulating valve 385, the line pressure control valve 390, the synchronizer valves 395, and the selectable one-way clutch control valves 397. In some implementations of the powertrain, the hydraulically-controlled component 410 may actually be two or more of these components.

Figure 5:
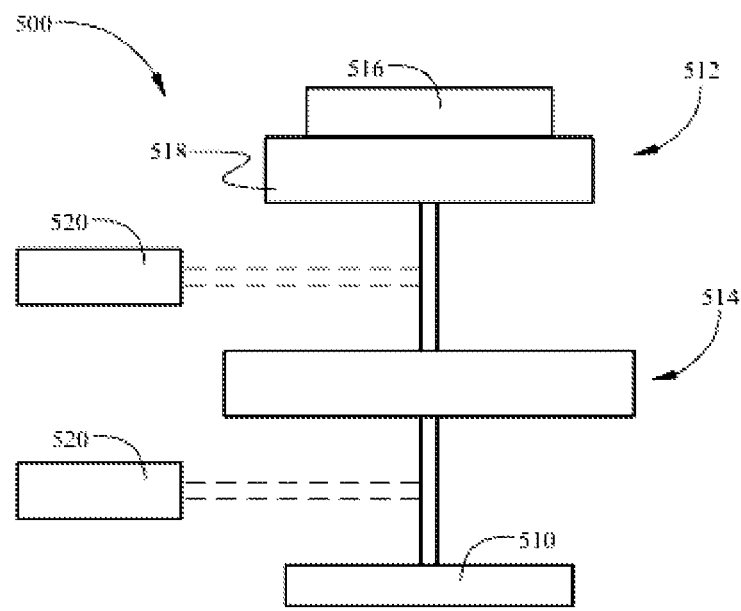
FIG. 5 is a schematic box diagram of a second option for a pressure control system for the hydraulic-controlled component within a powertrain for a hybrid vehicle.

FIG. 5 shows a second option 500 for a pressure control system for the hydraulically-actuated component 510 within the powertrain. The second option 500 includes a pilot valve 512 controlling a regulating valve 514. The regulating valve 514 is in fluid communication with the pilot valve 512.

The pilot valve 512 may include a first valve 516 producing a pilot signal. However, unlike the first option 400 shown in FIG. 4, in the second option 500, the pilot valve 512 also includes a second valve 518, which steps up, or amplifies, the pilot signal to an amplified pilot signal. The regulating valve 514 is configured to receive the amplified pilot signal and the regulating valve 514 is configured to output a control signal, which controls the hydraulically-actuated component 510. The hydraulically-controlled component 510 may be any one of the components of the powertrain shown in FIG. 3. For example, and without limitation, the hydraulically-controlled component 510 may be one of: the clutch control valves 382, the lube regulating valve 385, the line pressure control valve 390, the synchronizer valves 395, and the selectable one-way clutch control valves 397. In some embodiments of the powertrain, the hydraulically-controlled component 510 may actually be two or more of these components.

In the second option 500 shown in FIG. 5, the first valve 516 may include the MEMS microvalve 100 shown in FIG. 1 and the second valve 518 is the MEMS-based spool valve 200. Therefore, as already described herein, the MEMS microvalve 100 selectively produces the pilot signal and communicates through the pilot port 120 to the piloted chamber 220 of the MEMS-based spool valve 200. However, with the second option 500, the output of the MEMS-based spool valve 200 is the amplified pilot signal, which is then used by the regulating valve 514.

In the second option 500 shown in FIG. 5, the regulating valve 514 may include a conventional mechanical regulating valve. Generally, the conventional mechanical regulating valve is a regulating valve produced by mechanical machining processes. Based upon the amplified pilot signal provided by the pilot valve 512, the conventional mechanical regulating valve provides the control signal for the hydraulically actuated component 510.

The amplified pilot signal produced by the pilot valve 512 (including both the first valve 516 and the second valve 518 (the MEMS-base spool valve 200)) has sufficient pressure and flow characteristics to control the conventional mechanical regulating valve, which may then control the hydraulically-controlled component 510. However, the pilot signal produced by the first valve 516 (the MEMS microvalve 100) of the pilot valve 512 may not be able to directly pilot the conventional mechanical regulating valve or to directly control the hydraulically-controlled component 510. The conventional mechanical regulating valve further increases the pressure and flow characteristics used to control the hydraulically-controlled component 510, as compared to the first option 400 shown in FIG. 4.

The second option 500 may further include one or more MEMS-based pressure sensors such as a MEMS pressure sensor 520. However, when used, the MEMS pressure sensors 520 are configured to sense the pressure profile of amplified pilot signal from the pilot valve 512 or of the control signal from the regulating valve 514. In some implementations, only one of the MEMS pressure sensors 520 may be used. If used to sense the pressure profile of the pilot signal, the MEMS pressure sensor 520 may be packaged into a single package along with the MEMS microvalve 100 and the MEMS-based spool valve 200 for the pilot valve 512.

The control processor 340 or another computing device is configured to receive input from one of the MEMS pressure sensors 520 and to provide output to the MEMS microvalve 100 in the pilot valve 512 to regulate the system pressure in response to input from one of the MEMS pressure sensors 520. Therefore, the MEMS pressure sensors 520 provide closed-loop feedback and adjustment of the control signal sent to the hydraulically-controlled component 510.

The hydraulically-controlled component 510 may be any one of the components of the powertrain shown in FIG. 3. For example, and without limitation, the hydraulically-controlled component 510 may be one of: the clutch control valves 382, the lube regulating valve 385, the line pressure control valve 390, the synchronizer valves 395, and the selectable one-way clutch control valves 397. In some embodiments of the powertrain, the hydraulically-controlled component 510 may actually be two or more of these components. Each of the first option 400 and the second option 500 may be used with any of the components of the powertrain.

Figure 6:
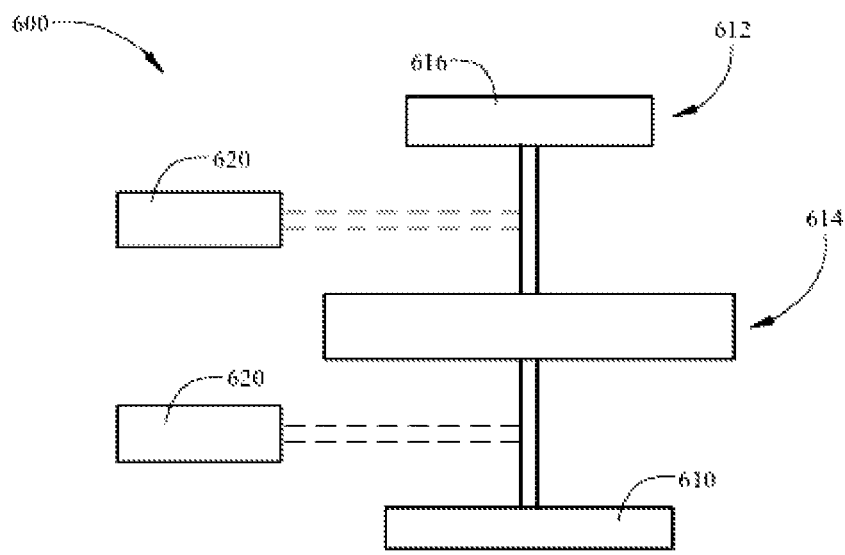
FIG. 6 is a schematic box diagram of a third option for a pressure control system for a third hydraulic component within a powertrain for a hybrid vehicle.

FIG. 6 shows a third option 600 for a pressure control system for the hydraulically-actuated component 610 within the powertrain. The third option 600 includes a pilot valve 612 controlling a regulating valve 614. The regulating valve 614 is in fluid communication with the pilot valve 612.

The pilot valve 612 includes a first valve 616 producing a pilot signal. The regulating valve 614 is configured to receive the pilot signal and the regulating valve 614 is configured to output a control signal, which controls the hydraulically-actuated component 610. The hydraulically-controlled component 610 may be any one of the components of the powertrain shown in FIG. 3. For example, and without limitation, the hydraulically-controlled component 610 may be one of: the clutch control valves 382, the lube regulating valve 385, the line pressure control valve 390, the synchronizer valves 395, and the selectable one-way clutch control valves 397. In some embodiments of the powertrain 305, the hydraulically-controlled component 610 may actually be two or more of these components. Each of the first option 400, the second option 500, and the third option 600 may be used with any of the components of the powertrain.

In the third option 600 shown in FIG. 6, the first valve 616 may include the MEMS microvalve 100 shown in FIG. 1, but there is no second valve forming the pilot valve similar to 512. Therefore, unlike the first option 400 shown in FIG. 4 and in the second option 500 shown in FIG. 5, the MEMS microvalve 100 communicates the pilot signal directly to the regulating valve 614, which may include a small mechanical spool valve.

Generally, the small mechanical spool valve is a regulating valve produced by mechanical machining processes, but on a smaller scale than the conventional mechanical regulating valve. Based upon the (un-amplified) pilot signal provided by the pilot valve 612, the small mechanical spool valve provides the control signal for the hydraulic-actuated component 610. Compared to the conventional mechanical regulating valve used in the second option 500 shown in FIG. 5, the small mechanical spool valve is, for example, on the order half of the size of the conventional mechanical regulating valve.

The pilot signal produced by the pilot valve 612 (including only the MEMS microvalve 100) may have sufficient pressure and flow characteristics to control the small mechanical spool valve used for the regulating valve 614, but may not be capable of directly controlling the conventional mechanical regulating valve used in the second option 500. The small mechanical spool valve may then control the hydraulically-controlled component 610. Depending on the response time and flow and pressure requirements, however, the pilot valve 612 may be used to control the conventional mechanical regulating valve described above.

The third option 600 may further include one or more optional MEMS pressure sensors 620. However, when used, the MEMS pressure sensors 620 are configured to sense the pressure profile of pilot signal from the pilot valve 612 or of the control signal from the regulating valve 614. In most configurations, only one of the MEMS pressure sensors 620 will be used. If used to sense the pressure profile of the pilot signal, the MEMS pressure sensor 620 may be packaged into a single package along with the MEMS microvalve 100 for the pilot valve 612.

The control processor 340 or other computing device, such as the engine control unit 350, is configured to receive input from one of the MEMS pressure sensors 620 and to provide output to the MEMS microvalve 100 in the pilot valve 612 to regulate the system pressure in response to input from one of the MEMS pressure sensors 620. Therefore, the MEMS pressure sensors 620 provide closed-loop feedback and adjustment of the control signal sent to the hydraulically-controlled component 610.

The hydraulically-controlled component 610 may be any one of the components of the powertrain shown in FIG. 3. For example, and without limitation, the hydraulically-controlled component 610 may be one of: the clutch control valves 382, the lube regulating valve 385, the line pressure control valve 390, the synchronizer valves 395, and the selectable one-way clutch control valves 397. In some embodiments of the powertrain 305, the hydraulically-controlled component 610 may actually be two or more of these components. Each of the first option 400, the second option 500, and the third option 600 may be used with any of the components of the powertrain.

Figure 7:
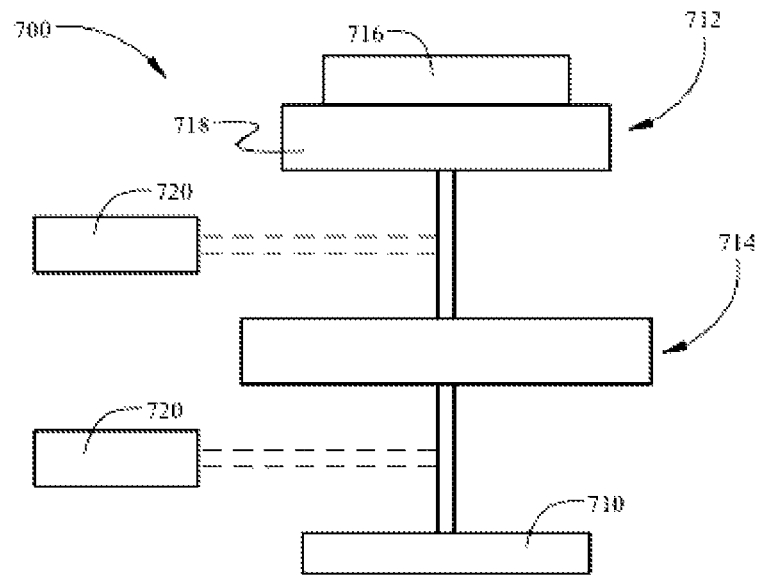
FIG. 7 is a schematic box diagram of a fourth option for a pressure control system for a fourth hydraulic component within a powertrain for a hybrid vehicle.

FIG. 7 shows a fourth option 700 for a pressure control system for the hydraulically-actuated component 710 within the powertrain. The fourth option 700 includes a pilot valve 712 controlling a regulating valve 714. The regulating valve 714 is in fluid communication with the pilot valve 712. The hydraulically-controlled component 710 may be any one of the components of the powertrain shown in FIG. 3. For example, and without limitation, the hydraulically-controlled component 710 may be one or more of: the clutch control valves 382, the lube regulating valve 385, the line pressure control valve 390, the synchronizer valves 395, and the selectable one-way clutch control valves 397. In some embodiments of the powertrain, the hydraulically-controlled component 710 may actually be two or more of these components.

The pilot valve 712 includes a first valve 716 producing a pilot signal. Similar to the second option 500 shown in FIG. 5, the pilot valve 712 also includes a second valve 718, which steps up, or amplifies, the pilot signal to an amplified pilot signal. The regulating valve 714 is again configured to receive the amplified pilot signal and the regulating valve 714 is configured to output a control signal, which controls the hydraulically-actuated component 710.

In the fourth option 700 shown in FIG. 7, the first valve 716 may include the MEMS microvalve 100 shown in FIG. 1. However, the second valve 718 may include the small mechanical spool valve. In the fourth option 700 shown in FIG. 7, the regulating valve 714 is again a conventional mechanical regulating valve. Based upon the amplified pilot signal provided by the pilot valve 712, the conventional mechanical regulating valve provides the control signal for the hydraulic-actuated component 710.

Therefore, as already described herein, the MEMS microvalve 100 selectively produces the pilot signal and communicates through the pilot port 120 to the piloted chamber 220 of the MEMS-based spool valve 200. However, with the fourth option 700, the output of the small mechanical spool valve is the amplified pilot signal, which is then used by the regulating valve 714. In the fourth option 700, the small mechanical spool valve functions similarly to the MEMS-based spool valve 200 used as the second valve 518 in the second option 500 shown in FIG. 5. However, the small mechanical spool valve used as the second valve 718 for the fourth option 700 may be at least 100 times larger than the MEMS-based spool valve 200 used for the second valve 518 in the second option 500.

The amplified pilot signal produced by the pilot valve 712 (including both the first valve 716 and the second valve 718) may have sufficient pressure and flow characteristics to control the conventional mechanical regulating valve, which may then control the hydraulically-controlled component 710. However, the pilot signal produced by the first valve 716 alone (the MEMS microvalve 100) may not be able to directly pilot the conventional mechanical regulating valve or to directly control the hydraulically-controlled component 710. The conventional mechanical regulating valve further increases the pressure and flow characteristics used to control the hydraulically-controlled component 710. Depending on the response time and flow and pressure requirements, however, the pilot valve 712 may be used to control the conventional mechanical regulating valve described above.

The fourth option 700 may further include one or more optional MEMS pressure sensors 720. However, when used, the MEMS pressure sensors 720 are configured to sense the pressure profile of pilot signal from the pilot valve 712 or of the control signal from the regulating valve 714. In most configurations, only one of the MEMS pressure sensors 720 will be used.

The control processor 340 or other computing device, such as the engine control unit 350, is configured to receive input from one of the MEMS pressure sensors 720 and to provide output to the MEMS microvalve 100 in the pilot valve 712 to regulate the system pressure in response to input from one of the MEMS pressure sensors 720. Therefore, the MEMS pressure sensors 720 provide closed-loop feedback and adjustment of the control signal sent to the hydraulically-controlled component 710.

The hydraulically-controlled component 710 may be any one of the components of the powertrain shown in FIG. 3. For example, and without limitation, the hydraulically-controlled component 710 may be one or more of: the clutch control valves 382, the lube regulating valve 385, the line pressure control valve 390, the synchronizer valves 395, and the selectable one-way clutch control valves 397. In some embodiments of the powertrain, the hydraulically-controlled component 710 may actually be two or more of these components. Each of the first option 400, the second option 500, the third option 600, and the fourth option 700 may be used with any of the components of the powertrain.

While the best modes for carrying out the invention have been described in detail, those familiar with the art to which this invention relates will recognize various alternative designs and embodiments for practicing the invention within the scope of the appended claims.

The invention claimed is:

1. A powertrain system in a hybrid vehicle comprising:
a transmission configured to receive a torque from at least one of an engine and at least one motor;
the transmission having a hydraulic device;
a micro-electro-mechanical system (MEMS) pilot microvalve configured to output an unamplified pilot signal through a microslider valve to a mechanical regulating valve;
wherein the mechanical regulating valve is operably connected to the MEMS pilot microvalve and the hydraulic device;
wherein the mechanical regulating valve is configured to receive the unamplified pilot signal from the MEMS pilot microvalve and to output a control signal; and
wherein fluid is directed to the hydraulic device in response to the control signal.

2. A powertrain system in a hybrid vehicle comprising:
a transmission configured to receive a torque from at least one of an engine and at least one motor:
the transmission having a hydraulic device:
a micro-electro-mechanical system (MEMS) pilot microvalve configured to output an unamplified pilot signal through a microslider valve to a mechanical regulating valve:

wherein the mechanical regulating valve includes a spool valve; wherein the mechanical regulating valve is operably connected to the MEMS pilot microvalve and the hydraulic device;

wherein the mechanical regulating valve is configured to receive the unamplified pilot signal from the MEMS pilot microvalve and to output a control signal; and wherein fluid is directed to the hydraulic device in response to the control signal.

3. A powertrain system as set forth in claim 1, wherein the hydraulic device includes at least one of a clutch assembly, a lube regulating valve, a line control pressure valve, a synchronizer valve, and a selectable one-way clutch control valve.

4. A powertrain system as set forth in claim 1, further comprising a pressure sensor operably disposed between the pilot valve and the hydraulic device.

5. A powertrain system as set forth in claim 4, wherein the pressure sensor includes a MEMS-based pressure sensor.

6. A vehicle comprising: an engine configured to generate a torque;
at least one motor configured to generate a torque;
a transmission configured to receive torque from at least one of the engine and the at least one motor; and
a clutch assembly configured to transfer a torque from the engine to the transmission;
wherein the transmission includes a hydraulic device operably connected to a micro-electro-mechanical systems (MEMS) pilot microvalve and a mechanical regulating valve;
wherein the MEMS pilot microvalve is configured to output an unamplified pilot signal through a microslider valve to the mechanical regulating valve;
wherein the mechanical regulating valve is configured to receive the unamplified pilot signal from the MEMS pilot microvalve and to output a control signal; and
wherein fluid is directed to the hydraulic device in response to the control signal.

7. A vehicle as set forth in claim 6, wherein the regulator valve includes a spool valve.

8. A vehicle as set forth in claim 6, wherein the hydraulic device includes at least one of a clutch assembly, a lube regulating valve, a line control pressure valve, a synchronizer valve, and a selectable one-way clutch control valve.

9. A vehicle as set forth in claim 6, further comprising a MEMS-based pressure sensor operably disposed between the pilot valve and the hydraulic device.

* * * * *